April 10, 1951 C. W. SPARKS ET AL 2,548,326
TRAVELING LAWN SPRINKLER
Filed Feb. 12, 1948 2 Sheets-Sheet 1
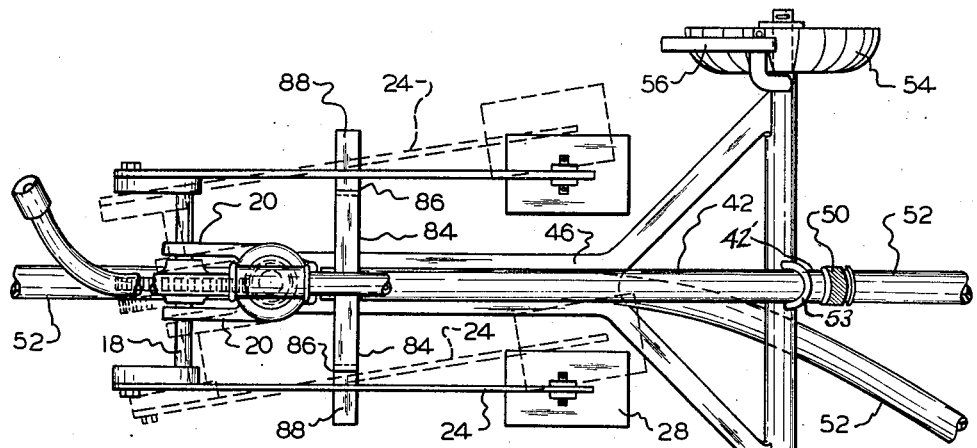
FIG. II.
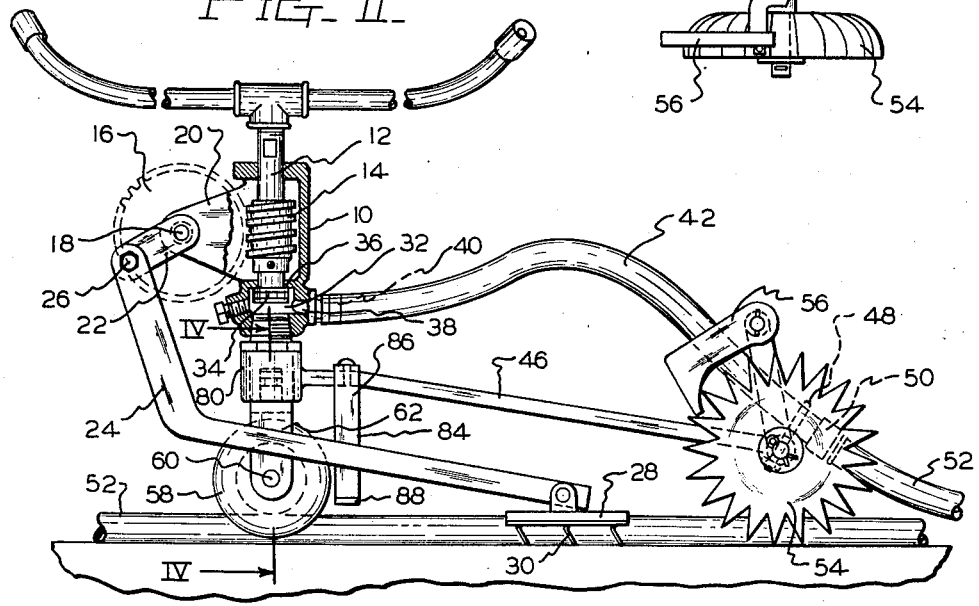
FIG. I.
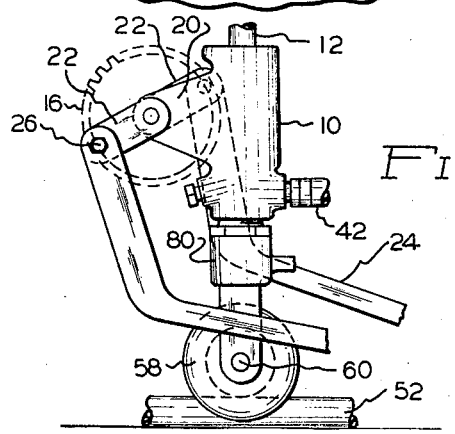
FIG. VI.
INVENTORS
CARTER W. SPARKS,
CLIFFORD M. SPARKS
and HENRY O. KLEE
ATTORNEYS

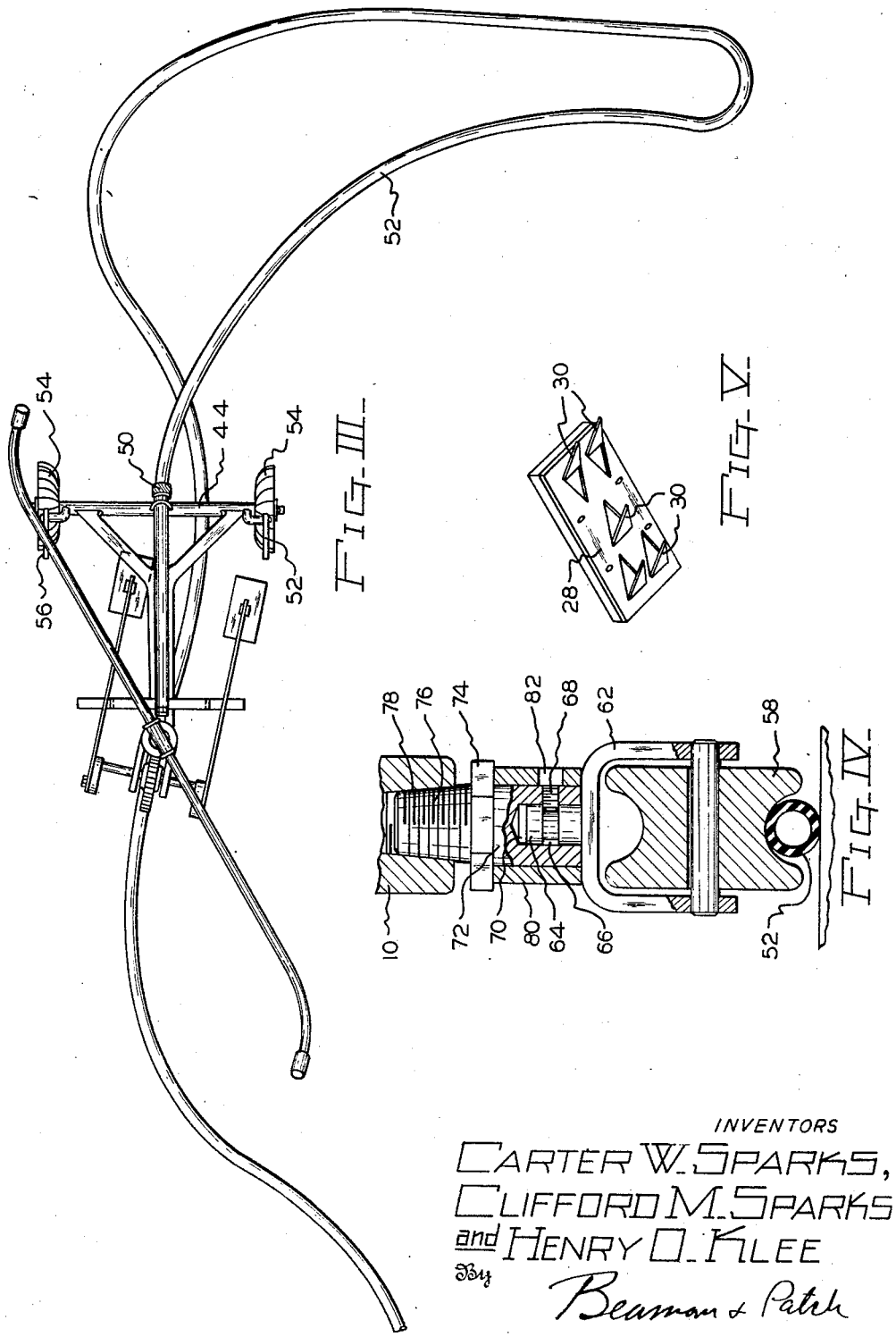

Patented Apr. 10, 1951

2,548,326

UNITED STATES PATENT OFFICE 2,548,326

TRAVELING LAWN SPRINKLER

Carter W. Sparks, Henry O. Klee, and Clifford M. Sparks, Jackson, Mich., assignors to Casalbi Company, Jackson, Mich., a corporation of Michigan Application February 12, 1948, Serial No. 7,846

8 Claims. (Cl. 299—50)

The present invention relates to improvements in lawn sprinklers of the type having a motor actuated by the water pressure; the motor actuating traction structure for moving the sprinkler slowly over the ground.

One of the objects of the invention is to provide an improved sprinkler of the aforesaid type which is especially adapted to being guided along a predetermined path defined by the hose or other structure disposed upon the ground.

Another object is to provide an improved traveling lawn sprinkler capable of following a highly tortuous path defined by the hose while towing a large amount of standard lawn or garden hose.

Another object is to provide a hose towing traveling lawn sprinkler having improved traction structure actuated from the water pressure motor.

A further object is to provide an improved traveling lawn sprinkler of the type described in which forward movement of the sprinkler is provided by reciprocating traction means while backward movement is resisted by ground wheels rotatable in a forward direction only.

A still further object is to provide a hose guided and hose towing traveling lawn sprinkler having a guide wheel and the water motor independently swivelled upon a common vertical axis.

A still further object is to provide a traveling lawn sprinkler of the type described having a reciprocated traction member engaging with the ground at a point between the hose guided wheel and a ground wheel rotatable in a forward direction only.

A still further object of the present invention is to provide a traveling lawn sprinkler of the type described having a gear housing supported in a wheel carriage, the gear housing driving the reciprocated traction member through a crank and pitman arrangement, the traction members operating on opposite sides of the longitudinal axis of the carriage and between the ends thereof.

These and other objects and advantages residing in the combination construction and arrangement of parts will be more fully appreciated from a consideration of the following specification and the annexed claims.

In the drawings:

Fig. I is a side elevational view of the lawn sprinkler defined in the present invention, the gear housing being shown in vertical cross section, Fig. II is a plan view of Fig. I, Fig. III is a plan view of the construction shown in Fig. I and illustrating the manner in which the hose is towed and followed, Fig. IV is a fragmentary cross sectional view of the swivel connection between the guided wheel and carriage, Fig. V is a perspective view of the ground engaging traction member or pad, and Fig. VI shows the crank upon the gear disposed at 180° to each other.

Referring to the illustrated form of the invention, our improved traveling lawn sprinkler comprises a gear housing and bracket member 10 in which a hollow post 12 is supported for rotation and carries a worm gear 14 meshing with and driving the gear 16 supported upon the shaft 18 between ears 20 integral with the housing 10. The ends of the shaft 18 extend a substantial distance beyond the ears 20 to receive the crank arms 22 to which the pitman members 24 are connected by pins 26. At the other end of the members 24, traction pads 28 are provided having downwardly and slightly rearwardly projecting teeth 30 for piercing the sod. As more clearly shown in Fig. I with the gear 16 rotating in the direction of the arrow, namely counter clockwise, the members 24 have just commenced their rearward thrust against traction members 28. It will be noted that the sod penetrating members 30 are inclined rearwardly so as to facilitate withdrawal of the members 28 from the sod when the crank 22 is imparting a forward movement to the members 24. At the same time this inclination of the members 30 tend to force the members 30 into the sod during the rearward traveling of the members 24.

Preferably the cranks 22 on opposite ends of the shaft 18 have the same position so that both members 24 are on opposite sides of the longitudinal axis of the carriage operate in unison. However, they may be 180° apart on the shaft 18 as shown in the modification of Fig. VI.

The lower portion of the gear housing 10 has an integrally formed chamber 32 into which the lower end of the post 12 opens. A collar 34 fixed to the lower end of the post 12 rotates in contact with the face 36 with sealing engagement, the water pressure within the chamber 32 tending to hold the collar 34 in engagement with the face 36. A passage 38 is in communication with an upper portion 40 to which a fixed flexible hose portion 42 is connected at one end with its opposite end to the axle portion 44 of the carriage 46 through a suitable clamp 48. A female connection 50 may be swivelled at the rear end of the hose 42 to permit the connection of the standard lawn or garden hose 52. A U-bolt 53 clamps the rear end of the hose 42 to the axle 44 to provide a hose towing connection 42' fixed to the rear end of the carriage 46.

The rear wheels 54 are preferably of spiked construction with suitable dogs 56 for permitting rotation of the wheels 54 in a forward direction only. Through this arrangement the wheels 54 are firmly engaged with the turf and will hold the carriage 46 from being drawn rearwardly by the resiliency or weight of the hose 52 at the time the traction members 28 are being advanced on the crank arms 22. Swivelled on the carriage 46 at the forward end is a guide wheel 58 grooved to ride upon the hose 52. The wheel 58 is supported upon a shaft 60 supported upon the opposite ends in a fork 62 having a post 64 grooved at 66 to receive a locking member 68 which holds the post 64 in the bore 70 of the bearing member 72. As shown the member 72 has a nut portion 74 for threading the portion 76 tightly into the housing 10 after the post 12 has been inserted through the threaded opening 78. The member 72 is freely swivelled in the collar 80 as is the post 64 freely swivelled in the bore 70. Thus the housing 10 and the wheel 58 are independently swivelled about a common vertical axis. The hole 72 in the collar 80 permits the insertion of a locking member 68 to assemble the post 64 in the bore 70. It will be noted that the collar 80 is positioned between the nut portion 74 and the fork 62.

To resist lateral forces transferred to the carriage 46 by the hose towing connection 42' and to provide support for the member 24 when the sprinkler is being carried, L-shaped members 84 are provided on opposite sides of the carriage 46. The upright portions 86 are engaged by the members 24 at the limit of the jointed movement between the motor and the carriage 46 as shown in the dotted line representation of Fig. II. When carrying the sprinkler, the member 24 drops downwardly slightly below the position of Fig. I to be supported on the lateral extension 88. It will be understood that when the pads 28 are penetrating the ground or turf lateral forces exerted upon the carriage through the hose towing connection 42' are resisted by the abutment presented by the arms 24 to the shoulders 86. This prevents the rear end of the carriage 46 from being pulled around by the hose being towed while the carriage is being advanced.

Having thus described our invention, what we claim as new and desire to protect by Letters Patent is:

1. In a traveling lawn sprinkler, a gear housing, a rotatable member having a worm gear thereon, a wheeled carriage in which said housing is supported, said carriage including a forward hose guide wheel and spaced rearward wheels, a gear meshing with said worm and supported for rotation from said housing, a pair of independently reciprocated traction means for engaging with the ground rearwardly of said hose guided wheel and forwardly of said spaced rearward spaced wheel, and a crank and pitman connection between each of said means and said gear for exerting a forward thrust on said housing to impart forward movement to said carriage over the ground, said traction means being disposed upon opposite sides of the longitudinal axis of said carriage.

2. In a traveling lawn sprinkler was defined in claim 1, wherein said gear housing is swivelled in said carriage.

3. In a traveling lawn sprinkler as defined in claim 2, wherein said guide wheel is swivelled in said carriage and independently from the swivel action of said housing.

4. In a traveling lawn sprinkler as defined in claim 1 wherein said carriage has at least one of said rearward wheels supported for rotation in a forward direction only, and means associated with said wheel to resist rotation in a backward direction to resist backward movement of said carriage over the ground.

5. In a traveling lawn sprinkler as defined in claim 1 wherein said traction means takes the form of ground engaging members located on opposite sides of the longitudinal axis of said carriage, and crank and pitman connections reciprocating said traction means the limits of which are disposed in the longitudinal confines of said wheel carriage.

6. A traveling lawn sprinkler comprising a carriage having a forward swivelled wheel and a pair of spaced rear wheels carried upon an axle fixed with said carriage, a hose towing connection fixed to said carriage at the rear thereof adjacent the axis of rotation of said rear wheels, a motor mounted for swivel movement at the forward end of said carriage around a vertical axis including reciprocating ground penetrating traction means, and supporting abutment structure in said carriage and disposed rearwardly of said vertical axis to receive said means to resist lateral forces transferred to the rear of said carriage through said hose towing connection with said means penetrating the ground.

7. A traveling lawn sprinkler comprising an articulated carriage having a forward hose guided wheel and a pair of laterally and longitudinally spaced rearward wheels, means associated with said rearward wheels to resist movement of said carriage in a rearward direction, means supported in the said carriage in which said hose guided wheel is supported for free swivel action about a vertical axis, a water reaction motor, traction mechanism including a housing, means supporting said housing for swivel movement in said carriage about a vertical axis, a vertical water reactive driven shaft supported in said housing for rotation, a worm gear on said shaft, a driven gear supported in said housing and meshing with said worm gear, a crank-shaft rotated by said driven gear and having cranks located on opposite end thereof, pitman members connected to said cranks and extending downwardly and rearwardly, and traction members on the rearward end of said pitman members for engagement with the ground on rearward movement of said pitman members for driving said carriage forward under the guiding action of said hose guided wheel, said traction members engaging the ground upon opposite sides of the longitudinal axis of said carriage and between said front and rearward wheels.

8. A traveling lawn sprinkler as defined in claim 7 wherein said housing and hose guided wheel are swivelled in said carriage independently of each other.

CARTER W. SPARKS.
HENRY O. KLEE.
CLIFFORD M. SPARKS.

REFERENCES CITED

The following references are of record in the file of this patent:

UNITED STATES PATENTS

| Number | Name | Date |
| --- | --- | --- |
| 1,223,246 | Bohnenkemper | Apr. 17, 1917 |
| 1,272,609 | Bohnenkemper | July 16, 1918 |
| 2,152,425 | Wilson | Mar. 28, 1939 |
| 2,228,428 | Wilson | Jan. 14, 1941 |